US012265622B2

(12) United States Patent
Lee et al.

(10) Patent No.: US 12,265,622 B2
(45) Date of Patent: Apr. 1, 2025

(54) ELECTRONIC DEVICE FOR PROVIDING SECURITY-REQUIRED SERVICE THROUGH SECURE ELEMENT, AND METHOD FOR CONTROLLING SAME ELECTRONIC DEVICE

(71) Applicant: Samsung Electronics Co., Ltd., Gyeonggi-do (KR)

(72) Inventors: Taeckki Lee, Gyeonggi-do (KR); Daehaeng Cho, Gyeonggi-do (KR); Eunyoung Kwon, Gyeonggi-do (KR); Gawon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 448 days.

(21) Appl. No.: 17/294,926

(22) PCT Filed: Nov. 14, 2019

(86) PCT No.: PCT/KR2019/015529
§ 371 (c)(1),
(2) Date: May 18, 2021

(87) PCT Pub. No.: WO2020/105955
PCT Pub. Date: May 28, 2020

(65) Prior Publication Data
US 2022/0004634 A1    Jan. 6, 2022

(30) Foreign Application Priority Data
Nov. 21, 2018    (KR) .................. 10-2018-0144081

(51) Int. Cl.
*G06F 21/57*    (2013.01)
*G06F 8/61*    (2018.01)
(Continued)

(52) U.S. Cl.
CPC ............... *G06F 21/57* (2013.01); *G06F 8/61* (2013.01); *G06F 21/44* (2013.01); *G06F 21/51* (2013.01); *G06F 21/74* (2013.01)

(58) Field of Classification Search
CPC .......... G06F 21/57; G06F 21/51; G06F 21/44; G06F 21/71; G06F 21/74
See application file for complete search history.

(56) References Cited

U.S. PATENT DOCUMENTS 8,196,131 B1    1/2012    Von Behren et al.
8,365,192 B2    1/2013    Holland et al.
(Continued)

FOREIGN PATENT DOCUMENTS

CN    107548486    1/2018
CN    108121490    6/2018
(Continued)

OTHER PUBLICATIONS

European Search Report dated Oct. 26, 2021 issued in counterpart application No. 19887863.9-1218, 9 pages.
(Continued)

*Primary Examiner* — Dao Q Ho
(74) *Attorney, Agent, or Firm* — The Farrell Law Firm, P.C.

(57) ABSTRACT

Disclosed is an electronic device comprising: a touchscreen display; a first processor operatively connected to the touchscreen display; a first memory operatively connected to the first processor so as to store a first application; and a secure element operatively connected to the touchscreen display; the first processor, and the first memory, wherein the secure element comprises a second processor, and a second memory configured to store a first framework, a plurality of second frameworks, and a first applet associated with the
(Continued)

first application. In addition, various embodiments identified through the specification are possible.

14 Claims, 9 Drawing Sheets

(51) Int. Cl.
    *G06F 21/44*     (2013.01)
    *G06F 21/51*     (2013.01)
    *G06F 21/74*     (2013.01)

(56) References Cited

U.S. PATENT DOCUMENTS

| | | | |
|---|---|---|---|
| 8,473,961 | B2 | 6/2013 | Krstic et al. |
| 8,631,482 | B2 | 1/2014 | Krstic et al. |
| 8,646,059 | B1* | 2/2014 | von Behren ............ G06F 21/35 |
| | | | 719/329 |
| 8,752,070 | B2 | 6/2014 | Holland et al. |
| 8,807,440 | B1 | 8/2014 | Von Behren et al. |
| 8,943,550 | B2 | 1/2015 | Krstic et al. |
| 9,880,830 | B2 | 1/2018 | Khan et al. |
| 10,191,718 | B2 | 1/2019 | Rhee et al. |
| 10,318,767 | B2 | 6/2019 | Herrell et al. |
| 11,023,201 | B2 | 6/2021 | Rhee et al. |
| 11,561,763 | B2 | 1/2023 | Rhee et al. |
| 2004/0122774 | A1* | 6/2004 | Studd ................... H04L 63/0853 |
| | | | 705/317 |
| 2012/0185863 | A1* | 7/2012 | Krstic ................. G06F 21/6281 |
| | | | 718/104 |
| 2014/0315600 | A1* | 10/2014 | Park ....................... H04W 4/50 |
| | | | 455/558 |
| 2015/0193221 | A1* | 7/2015 | Khan ..................... H04L 67/34 |
| | | | 713/176 |
| 2016/0321444 | A1 | 11/2016 | Kim et al. |
| 2017/0329998 | A1 | 11/2017 | Herrell et al. |
| 2018/0068301 | A1* | 3/2018 | Abdulrahman .... G06Q 20/3278 |
| 2022/0004634 | A1* | 1/2022 | Lee .......................... G06F 8/61 |

FOREIGN PATENT DOCUMENTS

| | | |
|---|---|---|
| KR | 10-2015-0055934 | 5/2015 |
| KR | 10-1803084 | 11/2017 |

OTHER PUBLICATIONS

Indian Examination Report dated Jan. 3, 2023 issued in counterpart application No. 202117021305, 7 pages.
PCT/ISA/237 Written Opinion issued on PCT/KR2019/015529, Mar. 13, 2020, pp. 8.
Chinese Office Action dated Dec. 9, 2023 issued in counterpart application No. 201980076773.9, 23 pages.
Indian Hearing Notice dated Mar. 11, 2024 issued in counterpart application No. 202117021305, 2 pages.

* cited by examiner

[Fig. 1]
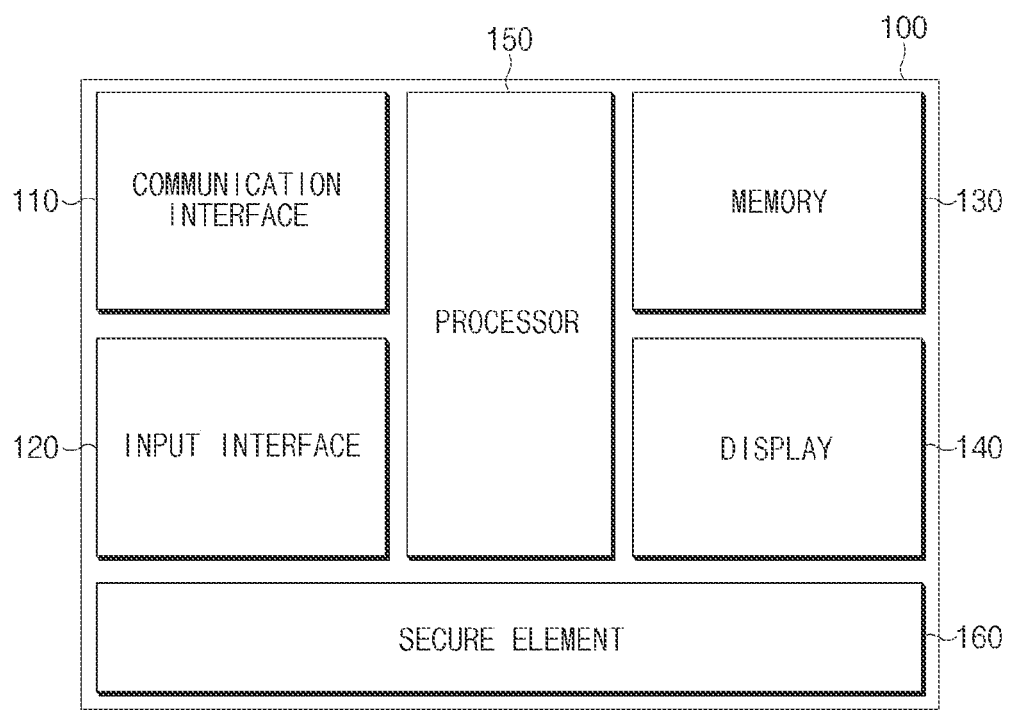

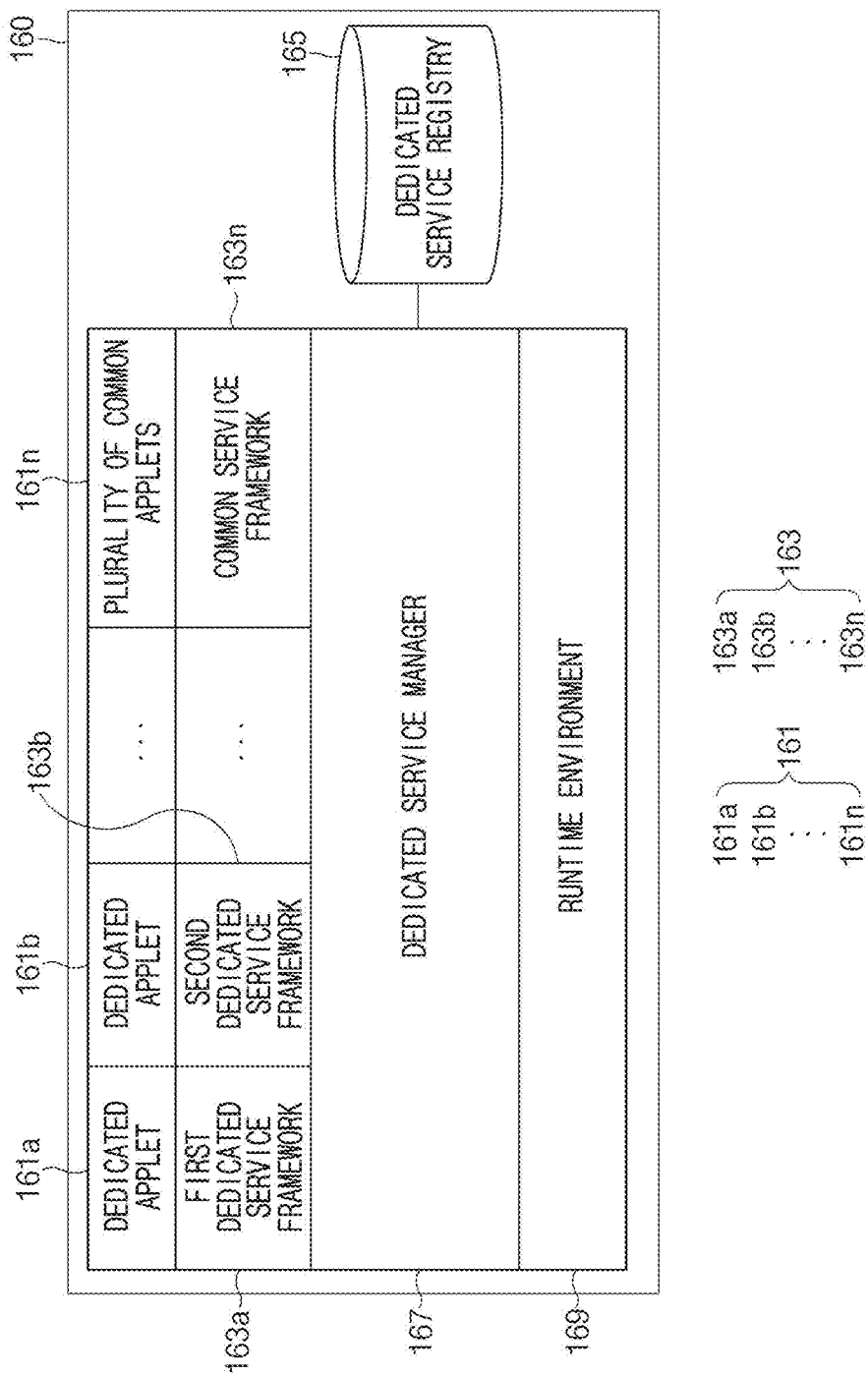
[Fig. 2]

[Fig. 3]
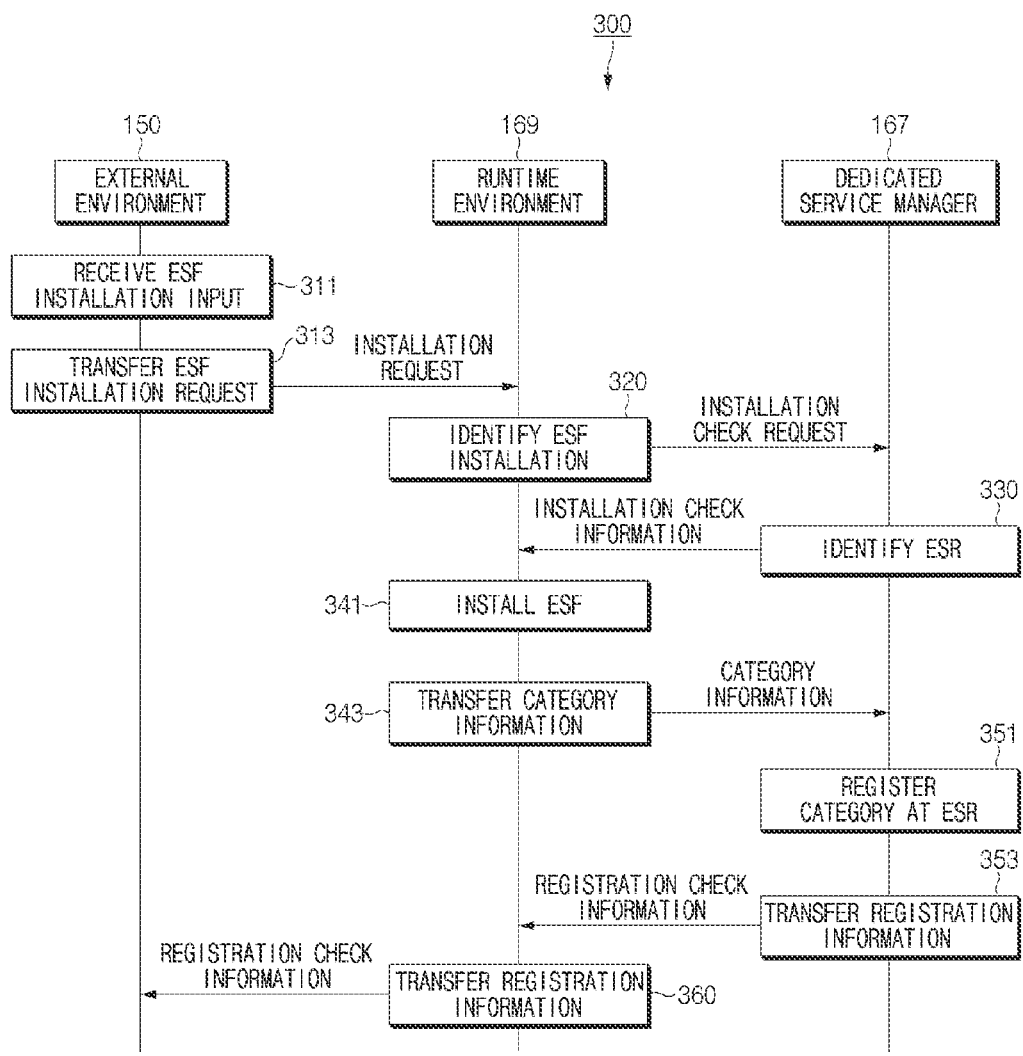

[Fig. 4]
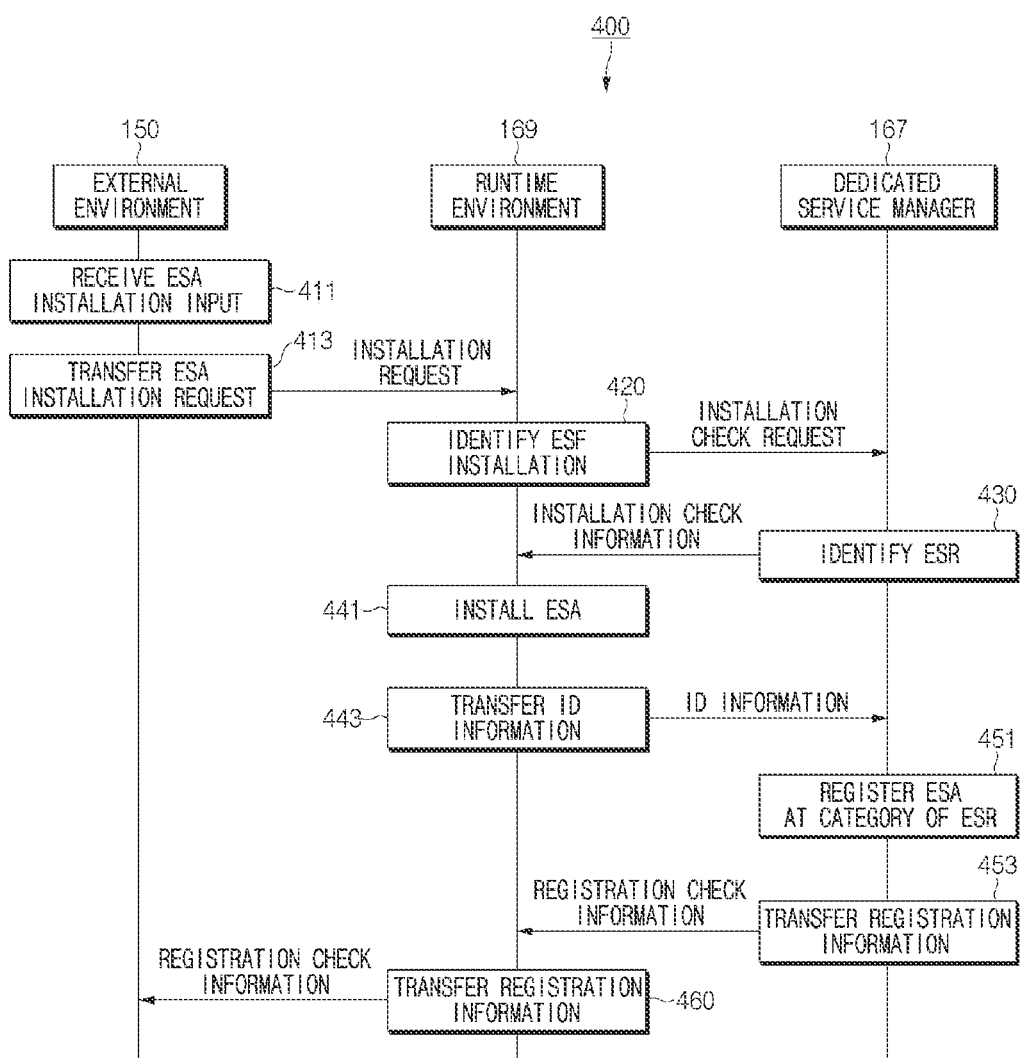

[Fig. 5]
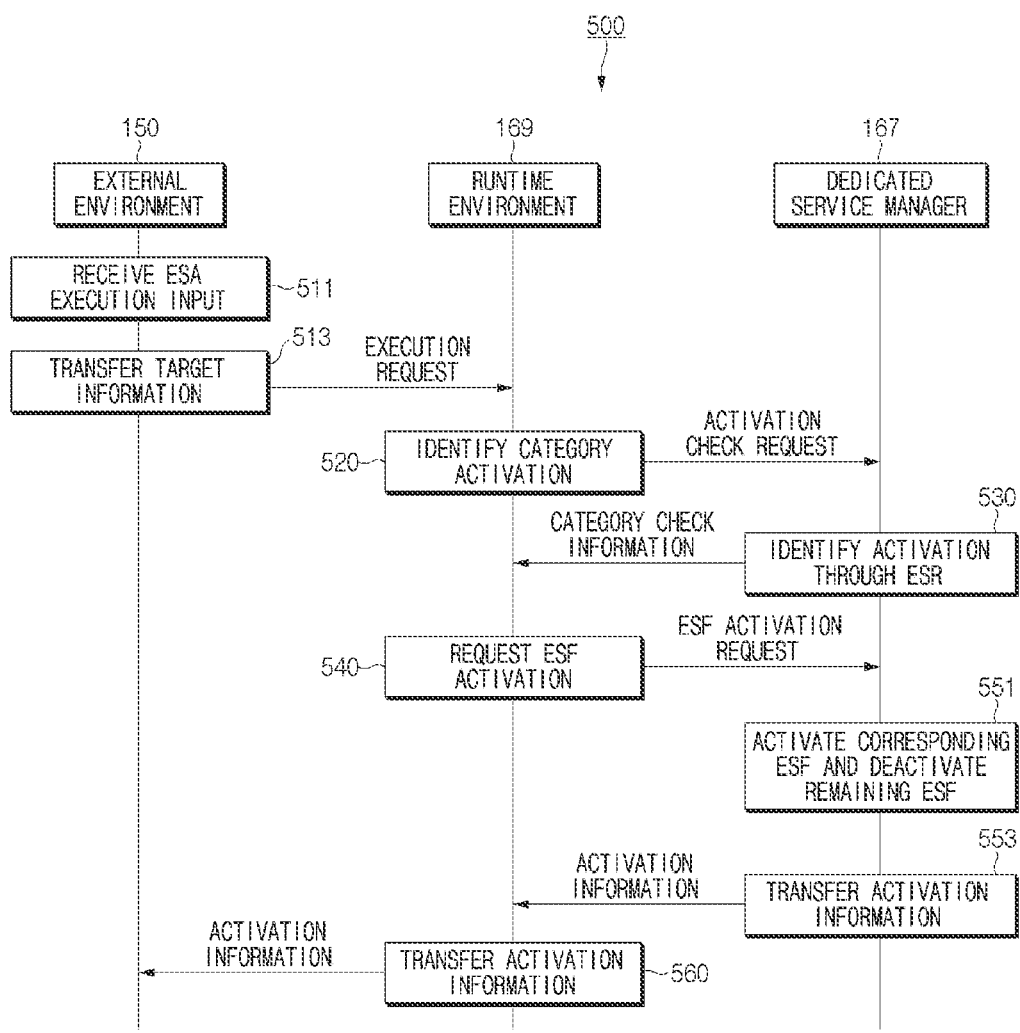

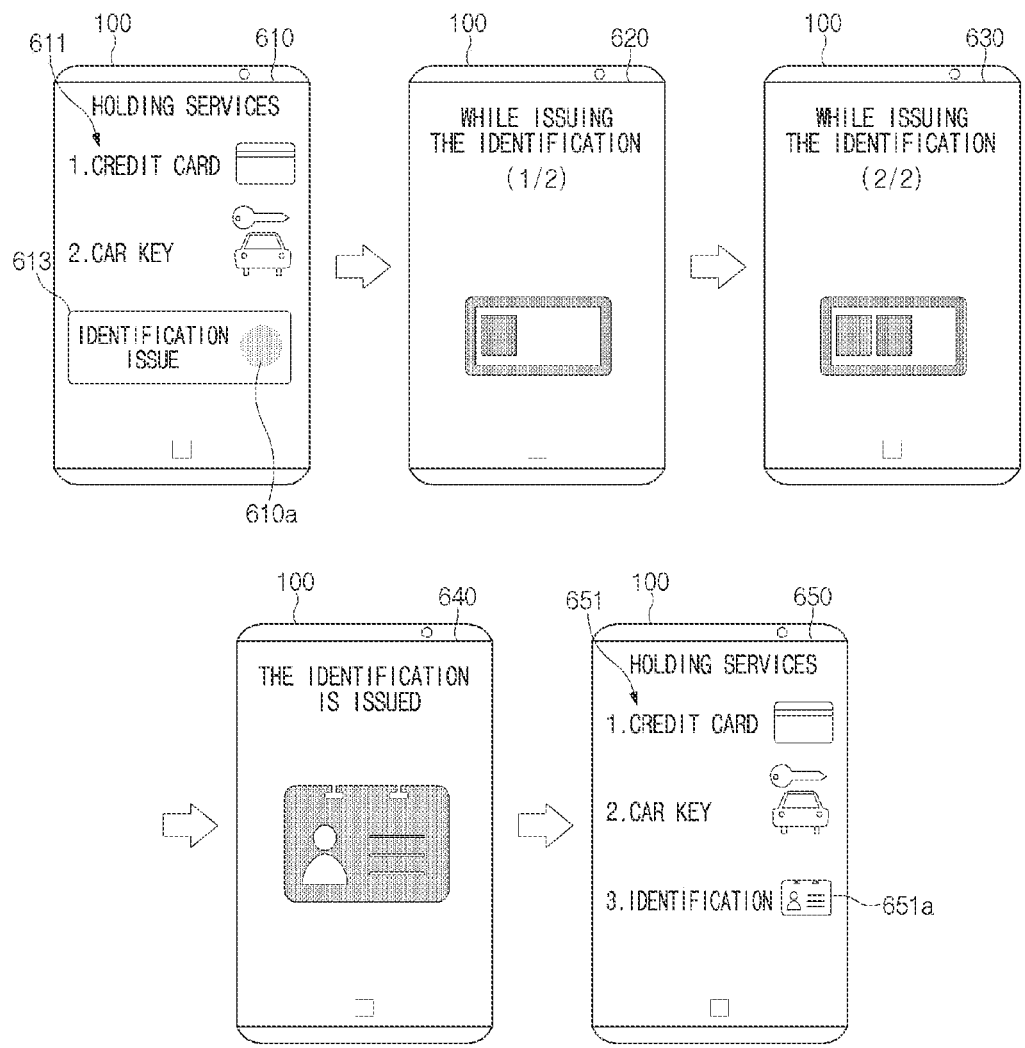
[Fig. 6]

[Fig. 7]
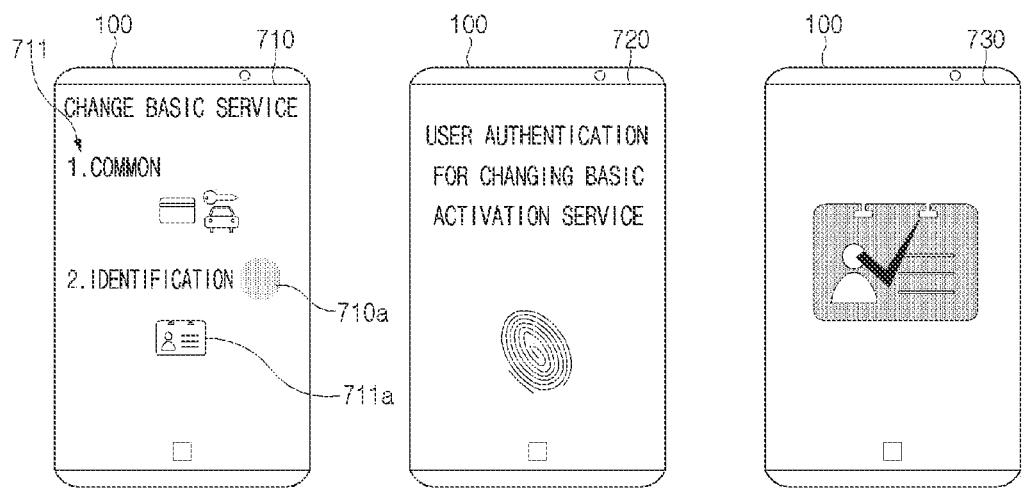
[Fig. 8]
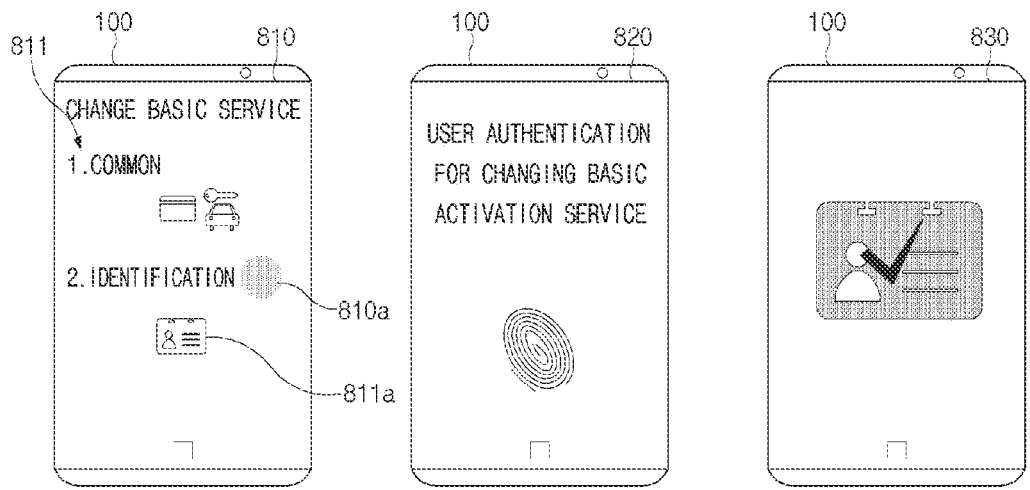

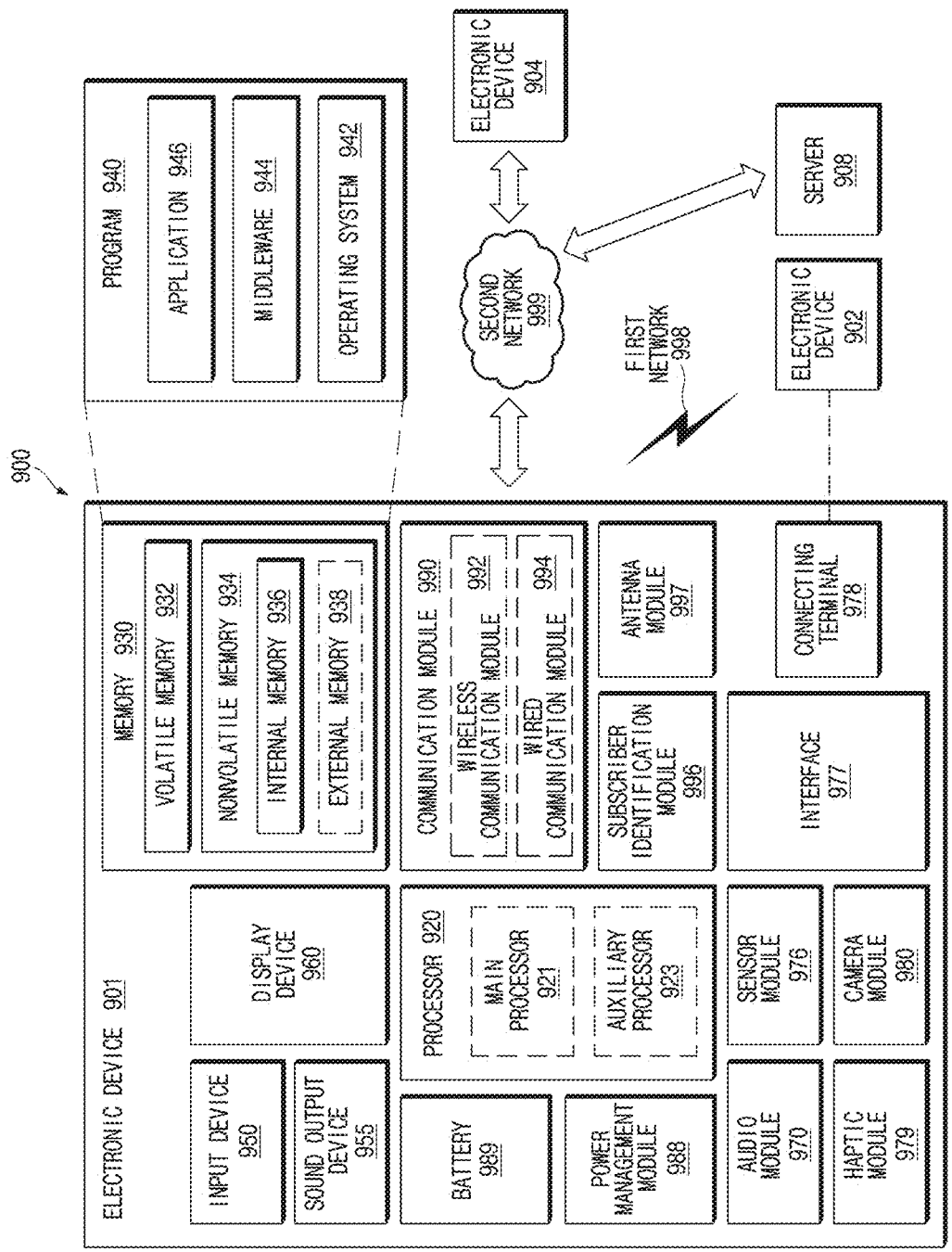
[Fig. 9]

[Fig. 10]
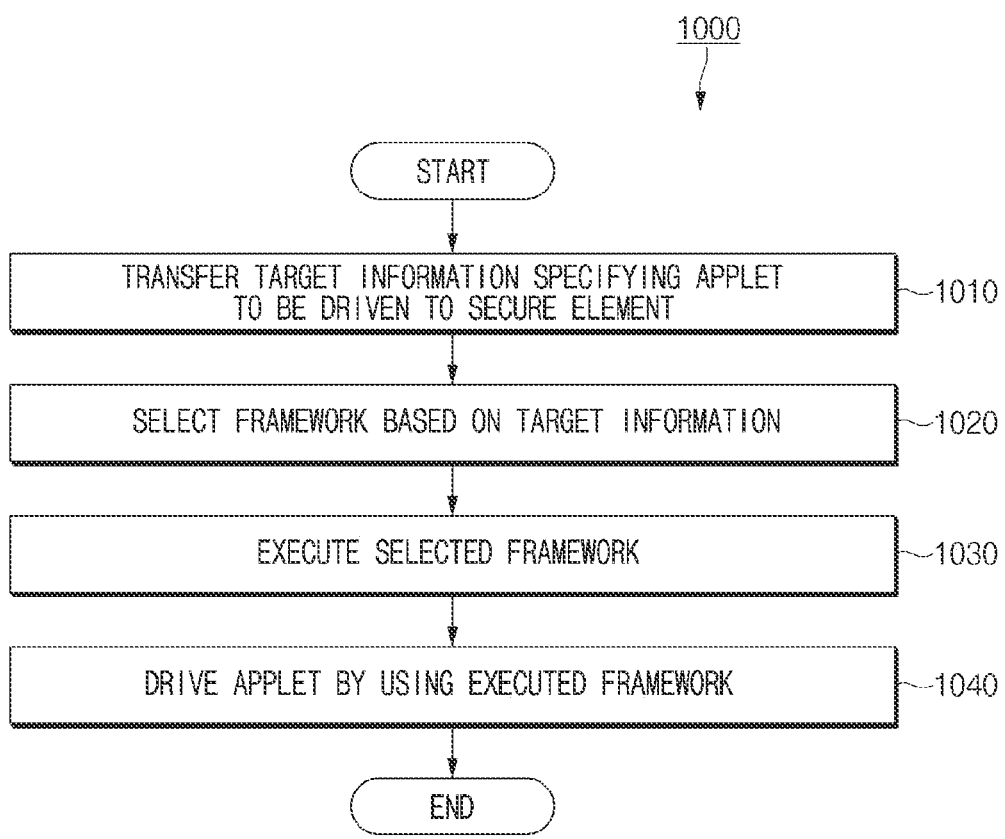

ELECTRONIC DEVICE FOR PROVIDING SECURITY-REQUIRED SERVICE THROUGH SECURE ELEMENT, AND METHOD FOR CONTROLLING SAME ELECTRONIC DEVICE

PRIORITY

This application is a National Phase Entry of PCT International Application No. PCT/KR2019/015529, which was filed on Nov. 14, 2019, and claims priority to Korean Patent Application No. 10-2018-0144081, which was filed on Nov. 21, 2018, the entire content of each of which is incorporated herein by reference.

TECHNICAL FIELD

Embodiments of the disclosure relate to a technology for providing a service requiring the security.

BACKGROUND ART

Functions and services that a portable device provides are being gradually expanded. Applications are being actively developed to provide various functions and services at the portable device. The development of various application programs (or apps) may make the effective value of the portable device high and may make it possible to satisfy various desires of a user.

Nowadays, the portable device may provide a service requiring the security by using a security function. In particular, the portable device may include a secure element (SE) and may provide the user with a service requiring the high security through the secure element. Also, the portable device may provide a plurality of security services through one secure element.

DISCLOSURE OF INVENTION

Technical Problem

When providing the user with a service requiring the security through an application, an electronic device may store information necessary to execute the application in a secure element. Depending on the degree of security required, the application that provides the security-requiring service may be executed by using a common service framework (CSF) or a dedicated service frame (or an exclusive service framework (ESF)). An application that provides a specific service may be dependent on the dedicated service framework stored in the secure element. In other words, it may be impossible to use the secure element for the purpose of providing a plurality of dedicated services different from each other. As such, it may be difficult to embed and use a secure element in an electronic device, which provides a plurality of dedicated services requiring the security.

An electronic device according to various embodiment of the disclosure may execute a plurality of frameworks for providing a dedicated service and a common service through one secure element.

Solution to Problem

According to an embodiment of the disclosure, an electronic device may include a touchscreen display, a first processor that is operatively connected with the touchscreen display, a first memory that is operatively connected with the first processor and stores a first application, and a secure element that is operatively connected with the touchscreen display, the first processor, and the first memory and includes a second processor, and a second memory to store a first framework, a plurality of second frameworks, and a first applet associated with the first application. The first memory may include instructions that, when executed, cause the first processor to receive a first user input requesting an execution of the first application through the touchscreen display and to transfer target information specifying the first applet to the secure element based on the first user input thus received. The second processor may select one framework of the plurality of second frameworks, based on at least a portion of information of the first applet corresponding to the target information, may execute the selected framework, and may drive the first applet by using the executed framework.

Also, according to an embodiment of the disclosure, a method for controlling an electronic device including a secure element may include receiving a first user input requesting an execution of a first application stored in a first memory, transferring target information specifying a first applet stored in a second memory included in the secure element to the secure element, based on the first user input thus received, selecting one framework of a plurality of frameworks stored in the second memory, based on at least a portion of information of the first applet corresponding to the target information, executing the selected framework, and driving the first applet by using the executed framework.

Advantageous Effects of Invention

According to embodiments of the disclosure, an electronic device may install a plurality of dedicated service frameworks in one secure element and may selectively activate the plurality of dedicated service frameworks thus installed, and thus, a plurality of dedicated services that are provided by using frameworks to be exclusively executed may coexist in one secure element.

Besides, a variety of effects directly or indirectly understood through this disclosure may be provided.

BRIEF DESCRIPTION OF DRAWINGS

FIG. 1 is a block diagram illustrating a configuration of an electronic device according to various embodiments.

FIG. 2 is a block diagram illustrating a configuration of a secure element according to various embodiments.

FIG. 3 is a sequence diagram indicating a method in which an electronic device according to an embodiment installs a dedicated service framework in a secure element.

FIG. 4 is a sequence diagram indicating a method in which an electronic device according to an embodiment installs a dedicated service applet in a secure element.

FIG. 5 is a sequence diagram indicating a method in which an electronic device according to an embodiment executes a dedicated service applet stored in a secure element.

FIG. 6 is a diagram illustrating a screen in which an electronic device according to an embodiment installs a dedicated service framework and an applet.

FIG. 7 is a diagram illustrating a screen in which an electronic device according to an embodiment sets a basic activation service.

FIG. 8 is a diagram illustrating a screen in which an electronic device according to an embodiment changes a specified service to an activation service.

FIG. 9 illustrates a block diagram of an electronic device in a network environment according to various embodiments.

FIG. 10 is a flowchart simply illustrating a process in which an electronic device executing an application provides a service by using a secure element, according to an embodiment.

With regard to description of drawings, the same or similar components will be marked by the same or similar reference signs.

MODE FOR THE INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

In the whole specification, an application means a program that is executed by a processor 150 for an electronic device 100 to provide a service. Also, an applet means a program that is installed and executed in a secure element 160 for the application to provide a service requiring the security. The applet may be executed by the secure element 160 to perform the security-requiring service.

In the whole specification, an applet ID (AID) means information about an identifier ID for identifying an applet.

FIG. 1 is a block diagram illustrating a configuration of an electronic device according to various embodiments.

Referring to FIG. 1, the electronic device 100 may execute an application program (or app), which provides a service (or function) requiring the security, by using the secure element 160.

According to an embodiment, the electronic device 100 may include a communication interface 110, an input interface 120, a memory (or first memory) 130, a display 140, the processor (or first processor) 150, and the secure element 160.

According to an embodiment, the communication interface 110 may be connected with an external device to transmit/receive data. The external device may be, for example, a server for providing data that are necessary to provide a service requiring the security. According to an embodiment, the communication interface 110 may include a wired communication interface and a wireless communication interface.

According to an embodiment, the input interface 120 may receive a user input. For example, the input interface 120 may include a touch panel capable of receiving a touch input of the user. The touch panel may be included, for example, in the display 140. In other words, the display 140 may be a touchscreen display including the touch panel.

According to an embodiment, the memory 130 may store at least one application. For example, the memory 130 may store an application that provides a service requiring the security. The security-requiring service may be, for example, a service (e.g., an electronic identification service) in which data necessary to provide a service are separated and stored. According to an embodiment, the memory 130 may store a framework that is used (or necessary) to execute a common application. For example, the memory 130 may store a framework that is used to execute an application providing a service in which the security is not important. A framework that is used to execute an applet providing a service requiring the security may be separated and stored in the secure element 160. According to an embodiment, the memory 130 may include an active memory and an inactive memory. A framework may mean a software layer that provides a base for executing a program.

According to an embodiment, the display 140 may display an image (or video image). For example, the display 140 may display a screen (e.g., a user interface (UI)) of an executed application. According to an embodiment, the display 140 may be a touchscreen display including a touch panel. In other words, the display 140 may include a touch panel.

According to an embodiment, the processor 150 may control overall operations of the electronic device 100. According to an embodiment, the processor 150 may be operatively connected with the communication interface 110, the input interface 120, the memory 130, and the display 140. According to an embodiment, when instructions stored in the memory 130 are executed, the processor 150 may perform the following operation.

According to an embodiment, the processor 150 may receive a user input for executing an application through the input interface 120. According to an embodiment, the processor 150 may receive a user input for installing an application or a framework through the input interface 120.

According to an embodiment, the processor 150 may execute an application stored in the memory 130. For example, the processor 150 may execute an application providing a security-requiring service in conjunction with one or more applets of the secure element 160. The application that provides the security-requiring service may provide, for example, a service in conjunction with an applet including at least one of an applet (or common service applet) providing a common service and an applet (or dedicated service applet) providing a dedicated service. The common service and the dedicated service may be distinguishable from each other depending on whether an applet for providing a service is dependent on a specific framework.

According to an embodiment, the processor 150 may execute an applet and a framework necessary to execute an application. For example, when a user input for executing an application is received, the processor 150 may execute an applet and a framework that are necessary for the application to provide a service. According to an embodiment, in the case of executing an application, which provides a service requiring the security, through the secure element 160, the processor 150 may execute a framework necessary to execute an applet providing the security-requiring service. For example, when a user input for executing the application providing the security-requiring service is received, the processor 150 may transfer, to the secure element 160, a request for executing the framework necessary to drive the applet for providing the security-requiring service. According to another embodiment, the processor 150 may directly execute a framework for executing an application in which the security is not important. As such, the processor 150 may cause an application, which is executed by using the executed framework, to perform a service.

According to an embodiment, the processor 150 may display a screen of an executed application in the display 140. For example, the processor 150 may display an UI of the executed application in the display 140.

According to an embodiment, the secure element 160 may provide an environment for providing a service requiring the security. For example, the secure element 160 may provide an exclusive environment for providing a specific service. According to an embodiment, the secure element 160 may be electrically connected with the processor 150 to make interaction. According to an embodiment, the secure element 160 may store information necessary to execute an application providing a security-requiring service.

According to an embodiment, the secure element 160 may store a framework necessary to execute an applet providing a security-requiring service. For example, the secure element 160 may store at least one of a common service framework (CSF) and a dedicated service framework (or an exclusive service framework (ESF)). In the specification, the common service framework may be referred to as a "first framework". Also, the dedicated service framework may be referred to as a "second framework".

According to an embodiment, the common service framework may be used to execute an applet for providing a common service. The applet for providing the common service may not be, for example, dependent on the specific framework. In other words, a framework (or open platform) for providing a common function may be used to execute the applet for providing the common service. The common service framework may be used to drive an applet associated with a plurality of different services.

According to an embodiment, the dedicated service framework may be used to execute an applet for providing a dedicated service. The applet for providing the dedicated service may be, for example, dependent on the specific framework. In other words, the specific framework (or closed platform) for providing the dedicated service may be used to execute the applet for providing the dedicated service. According to an embodiment, at least one applet that is executed by using the specific framework may be grouped to one category. The one category may be, for example, the concept corresponding to the specific framework. The dedicated service framework may be used to drive an applet associated with only one service.

According to an embodiment, an applet associated with an application providing a security-requiring service may be installed in the secure element 160. The applet may be issued, for example, to the secure element 160 in which information necessary for the execution of the application providing the security-requiring service is stored. According to an embodiment, the applet may be driven by using the executed framework. According to an embodiment, when an execution request for an applet for providing a service is received from the processor 150 executing an application, the secure element 160 may execute a framework, which the applet requires, based on information of the execution-requested applet.

When providing the user with a security-requiring service through an application, the electronic device 100 may store information necessary to execute the application in the secure element 160. An applet in the secure element 160, which provides a security-requiring service, may be operated by using the common service framework or the dedicated service framework depending on a characteristic of a service to be provided or the degree of security required. Because the case where an applet providing a specific service should not share a service framework in the secure element 160 together with another service exists, the secure element 160 may vest in the corresponding applet and may be used only for the corresponding applet. As such, in the case where the secure element 160 is embedded in an electronic device, it may be difficult for the electronic device to provide a plurality of services requiring the security. The electronic device 100 according to various embodiment of the disclosure may execute a plurality of frameworks for providing a dedicated service and a common service through one secure element 160.

FIG. 2 is a block diagram illustrating a configuration of a secure element according to various embodiments.

Referring to FIG. 2, the secure element 160 may execute a dedicated service framework and a common service framework that are used to execute applets for providing a dedicated service and a common service.

According to an embodiment, the secure element 160 may include a plurality of applets 161, a plurality of frameworks 163, a dedicated service registry 165, a dedicated service manager 167, and a runtime environment 169. According to an embodiment, the secure element 160 may include a memory (or second memory) and a processor (or second processor). In other words, the secure element 160 may be implemented through the memory and the processor. For example, the plurality of applets 161 and the plurality of frameworks 163 may be programs stored in the memory. The dedicated service registry 165 may be implemented by the memory. Operations of the dedicated service manager 167 and the runtime environment 169 may be operations of the processor, which are performed when instructions stored in the memory are executed.

According to an embodiment, the plurality of applets 161 may include a plurality of dedicated applets 161a and 161b and a plurality of common applets 161n. According to an embodiment, the plurality of applets 161 may be respectively associated with a plurality of applications stored in the memory (e.g., the memory 130 of FIG. 1). For example, the plurality of applets 161 may be driven, and an application corresponding to each of the driven applets may operate. According to an embodiment, the plurality of applets 161 may respectively correspond to the plurality of applications stored in the memory. For example, the first dedicated applet 161a and the second dedicated applet 161a may respectively correspond to a plurality of applications providing different dedicated services. The plurality of common applets 161n may respectively correspond to a plurality of applications providing common services.

According to an embodiment, the plurality of frameworks 163 may include a plurality of dedicated service frameworks 163a and 163b and a common service framework 163n. Each of the dedicated service frameworks 163a and 163b may be a framework that is used exclusively for a specific service. For example, the dedicated service framework 173 may be a framework that is used exclusively for an identification-related service. Here, an applet for providing a service may include one or more applets. As an example associated with the case where a plurality of applets for providing services exit, an applet for providing an identification-related service may include an identification card applet and a driving license applet. For another example, a plurality of applets for providing an identification card-related service may exist. The common service framework 163n may be a framework that is used to implement a common function. According to an embodiment, the plurality of frameworks 163 may be used when the plurality of applications stored in the memory provide services, respectively. For example, when one of the plurality of frameworks 163 is executed, an applet may be driven based on the executed framework. When the applet is driven, an application corresponding to the driven applet may provide a service by using the driven applet. In other words, an applet interworking with an application may be executed by using an executed framework. According to an embodiment, each of the plurality of frameworks 163 may correspond to one or more of the plurality of applets 161. For example, the first dedicated service framework 163a and the second dedicated service framework 163b may correspond to the first dedicated applet 161a and the second dedicated applet 161b, respectively. For another example, in the case where the first dedicated service framework 163a is a service framework used to provide an identification service that the government provides, an identification card-related applet and a driving license-related applet may be executed based on the first dedicated service framework 163a. The common service framework 163n may correspond to the plurality of common applets 161n.

According to an embodiment, the dedicated service registry 165 may store information about the plurality of dedicated service frameworks 163a and 163b and a plurality of applets corresponding to the plurality of dedicated service frameworks 163a and 163b. In other words, the dedicated service registry 165 may store information by which the plurality of dedicated service frameworks 163a and 163b and the plurality of applets are bound. According to an embodiment, the dedicated service registry 165 may store information (e.g., CPARAM_1) about a plurality of categories corresponding to the plurality of dedicated service frameworks 163a and 163b. Also, the dedicated service registry 165 may store AIDs (e.g., AID_1) of the plurality of dedicated applets 161a and 161b respectively included in the plurality of categories. As such, the dedicated service registry 165 may store information (e.g., list information) about a dedicated service framework necessary to execute an applet of the secure element 160.

According to an embodiment, the dedicated service manager 167 may determine whether a dedicated service framework is installed. For example, the dedicated service manager 167 may determine whether a dedicated service framework is installed, by using the category information stored in the dedicated service registry 165. According to an embodiment, when receiving an execution request for an applet, the dedicated service manager 167 may determine whether a dedicated service framework corresponding to the execution-requested applet is installed. In the specification, the dedicated service framework corresponding to the execution-requested applet may be referred to as a "third framework". For example, by determining whether information of a category including an applet ID (AID) corresponding to the execution-requested applet is stored in the dedicated service registry 165, the dedicated service manager 167 may determine whether the dedicated service framework corresponding to the execution-requested applet is installed. According to an embodiment, when receiving an installation request for a dedicated service framework or an applet, the dedicated service manager 167 may determine whether the installation-requested dedicated service framework or a dedicated service framework corresponding to the installation-requested applet is installed. For example, by determining whether information of a category corresponding to the execution-requested dedicated service framework is stored in the dedicated service registry 165, the dedicated service manager 167 may determine whether the dedicated service framework is installed. Alternatively, by determining whether information of a category including an applet ID (AID) corresponding to the installation-requested applet is stored in the dedicated service registry 165, the dedicated service manager 167 may determine whether the dedicated service framework is installed.

According to an embodiment, the dedicated service manager 167 may manage information stored in the dedicated service registry 165. For example, the dedicated service manager 167 may store information about the plurality of dedicated applets 161a and 161b and the plurality of dedicated service frameworks 163a and 163b. According to an embodiment, the dedicated service manager 167 may store information about an installed dedicated service framework in the dedicated service registry 165. For example, the dedicated service manager 167 may register a category corresponding to the installed dedicated service framework at the dedicated service registry 165. According to an embodiment, the dedicated service manager 167 may store information about a dedicated applet corresponding to an application, which is installed by the processor 150 to provide a service, in the dedicated service registry 165. For example, the dedicated service manager 167 may register an AID of a dedicated applet corresponding to an application installed by the processor 150 at a specified category. The specified category may be, for example, a category corresponding to a dedicated service framework necessary to execute the application installed by the processor 150. According to an embodiment, the dedicated service manager 167 may be implemented independently of the runtime environment 169 or may be implemented as a part of the runtime environment 169.

According to an embodiment, the runtime environment 169 may execute (or activate) a framework necessary to execute an applet. In the specification, the expression "to execute a frame" may include the concept that an operation of activating a framework is performed. In other words, the runtime environment 169 may be an operating system (OS) for executing a framework. For example, the runtime environment 169 may execute a dedicated service framework or a common service framework that is used to execute an applet. According to an embodiment, the runtime environment 169 may drive an applet corresponding to an executed framework. For example, the runtime environment 169 may drive a dedicated applet or a common applet corresponding to an executed framework. As such, an applet providing a dedicated service requiring the security may be executed by using a framework executed in the runtime environment 169.

FIG. 3 is a sequence diagram 300 indicating a method in which an electronic device according to an embodiment installs a dedicated service framework in a secure element.

Referring to FIG. 3, the electronic device (e.g., the electronic device 100 of FIG. 1) may install a dedicated service framework (or an exclusive service framework (ESF)) depending on a user input. The dedicated service framework may be installed in the process of producing the electronic device or may be installed by the user or the like in the process of using the electronic device. The user may install the dedicated service framework in the secure element 160 through a path of a market capable of downloading an application.

According to an embodiment, the electronic device may include a secure element (e.g., the secure element 160) and a component (or external environment) (e.g., the processor 150 of FIG. 1) outside the secure element.

According to an embodiment, in operation 311, the external environment 150 of the electronic device may receive a user input (or first user input) for installing the dedicated service framework (ESF) (or first dedicated service framework). For example, the processor of the electronic device may receive the user input for installing the dedicated service framework through an input interface (e.g., the input interface 120 of FIG. 1).

According to an embodiment, in operation 313, the external environment 150 of the electronic device may transfer a request for installing the dedicated service framework to the runtime environment 169 of the secure element in response to the user input. The installation request may include information of a category corresponding to the dedicated service framework installation-requested.

According to an embodiment, in operation 320, the runtime environment 169 of the secure element may determine whether the installation-requested dedicated service framework is installed, through the dedicated service manager 167. For example, the runtime environment 169 may transfer an installation check request for a specified additional dedicated service framework to the dedicated service manager 167. The specified additional dedicated service framework may be, for example, a new dedicated service framework that is not installed in the secure element.

According to an embodiment, in operation 330, the dedicated service manager 167 may determine whether the specified dedicated service framework is installed, through a dedicated service registry (e.g., the dedicated service registry 165 of FIG. 2). For example, the dedicated service manager 167 may determine whether the category of the installation-requested dedicated service framework is registered at the dedicated service registry. Alternatively, whether the category corresponding to the installation-requested dedicated service framework is stored in a memory of the secure element 160 may be determined. According to an embodiment, the dedicated service manager 167 may transfer installation check information of the specified dedicated service framework to the runtime environment 169.

According to an embodiment, in operation 341, the runtime environment 169 may install the dedicated service framework based on the transferred installation check information. For example, when the specified dedicated service framework is not installed, the runtime environment 169 may install the specified dedicated service framework. The specified dedicated service framework may be installed in the same layer as the common service framework. According to an embodiment, when the specified dedicated service framework is in a state of being installed, the runtime environment 169 may transfer the installation check information to the external environment 150. The installation check information may be provided to the user.

According to an embodiment, in operation 343, the runtime environment 169 may transfer category information to the dedicated service manager 167. For example, the runtime environment 169 may transfer the category information included in the installation request for the dedicated service framework to the dedicated service manager 167.

According to an embodiment, in operation 351, the dedicated service manager 167 may make registration at the dedicated service registry by using the transferred category information (or may store the category information in the memory of the secure element 160). According to an embodiment, in operation 353, the dedicated service manager 167 may transfer the registration information to the runtime environment 169.

According to an embodiment, in operation 360, the dedicated service manager 167 may transfer the transferred registration information to the external environment 150. As such, the external environment 150 of the electronic device may recognize that the requested dedicated service framework is installed.

FIG. 4 is a sequence diagram 400 indicating a method in which an electronic device according to an embodiment installs a dedicated service applet.

Referring to FIG. 4, the electronic device (e.g., the electronic device 100 of FIG. 1) may install a dedicated service applet (ESA) depending on a user input.

According to an embodiment, in operation 411, the external environment 150 of the electronic device may receive a user input (or second user input) for installing the dedicated service applet (ESA) (or first dedicated service applet). For example, the processor of the electronic device may receive the user input for installing a dedicated applet through an input interface (e.g., the input interface 120 of FIG. 1). For example, in the case of receiving a user input that executes an instruction causing the external environment 150 to install a new application (or second application), the external environment 150 may obtain information (e.g., information including AID or category information) about a dedicated service applet associated with an application to be installed, through a path or the like of a market capable of downloading the application.

According to an embodiment, in operation 413, the external environment 150 of the electronic device may transfer a request for installing the dedicated service applet to the runtime environment 169 of the secure element in response to the user input. The installation request may include an AID of the installation-requested dedicated service applet, and information of a category corresponding to a dedicated service framework necessary to execute the dedicated service applet.

According to an embodiment, in operation 420, the runtime environment 169 of the secure element may determine whether the dedicated service framework used to execute the installation-requested dedicated service applet is installed, through the dedicated service manager 167. For example, the runtime environment 169 may transfer an installation check request for a specified dedicated service framework to the dedicated service manager 167.

According to an embodiment, in operation 430, the dedicated service manager 167 may determine whether the specified dedicated service framework is installed, through a dedicated service registry (e.g., the dedicated service registry 165 of FIG. 2). For example, the dedicated service manager 167 may determine whether a category of the dedicated service framework used to execute the installation-requested dedicated service applet is registered at the dedicated service registry. The dedicated service manager 167 may determine whether the specified dedicated service framework is installed, by using the category information included in the installation request. According to an embodiment, the dedicated service manager 167 may transfer installation check information of the specified dedicated service framework to the runtime environment 169.

According to an embodiment, in operation 441, the runtime environment 169 may install the dedicated service applet based on the transferred installation check information. For example, when the dedicated service framework used to execute the installation-requested applet is not installed, the runtime environment 169 may install the specified dedicated service framework. When the specified dedicated service framework is not installed, the runtime environment 169 may transfer guide information for installing the specified dedicated service framework to the external environment 150. The installation guide information may be provided to the user. According to an embodiment, in operation 441, the runtime environment 169 may install the specified dedicated service applet through the external environment 150. For example, the runtime environment 169 may transfer installation information of the dedicated service framework to the external environment 150, and the runtime environment 169 may install the specified dedicated service applet from the external environment 150 as a response to the installation information. According to an embodiment, the runtime environment 169 may store an applet (or second applet) corresponding to an application installed by the processor 150.

According to an embodiment, in operation 443, the runtime environment 169 may transfer ID information to the dedicated service manager 167. For example, the runtime environment 169 may transfer AID information included in the installation request for the dedicated service applet to the dedicated service manager 167.

According to an embodiment, in operation 451, the dedicated service manager 167 may update a specified category by using the transferred AID information. For example, the dedicated service manager 167 may register the transferred AID information at the specified category. The specified category may be, for example, a category corresponding to a dedicated service framework used to execute the installed dedicated service applet. According to an embodiment, in operation 453, the dedicated service manager 167 may transfer the registration information to the runtime environment 169.

According to an embodiment, in operation 460, the dedicated service manager 167 may transfer the transferred registration information to the external environment 150. As such, the external environment 150 of the electronic device may recognize that the requested dedicated service applet is installed.

According to an embodiment, the external environment 150 may be configured to install an installation-requested application only in the case where a dedicated service framework necessary to drive an applet for providing a service of the installation-requested application is stored in the secure element 160.

FIG. 5 is a sequence diagram 500 indicating a method in which an electronic device according to an embodiment executes a dedicated service applet.

Referring to FIG. 5, the electronic device (e.g., the electronic device 100 of FIG. 1) may execute a dedicated service applet (ESA) for the purpose of performing a service according to a user input.

According to an embodiment, in operation 511, the external environment 150 of the electronic device may receive a user input (or third user input) for executing the dedicated service applet (ESA) (or second dedicated service applet). For example, through a user interface, the processor of the electronic device may receive a user input for selecting a service, which is provided by using the second dedicated service applet, from among one or more services that an application executed by the processor provides. However, operation 511 may be for describing an embodiment, and operation 511 may be replaced with another operation that requires the driving of a dedicated service applet to allow the application executed at the external environment 150 to provide a service even without a user input.

According to an embodiment, in operation 513, the external environment 150 of the electronic device may transfer a request for executing the dedicated service applet to the runtime environment 169 of the secure element in response to the user input. The execution request may include, for example, target information specifying a dedicated service applet. The target information may include information about an AID and a category of the execution-requested dedicated service applet.

The runtime environment 169 may determine a category in which the execution-request applet is included and may select a dedicated service framework corresponding to the determined category.

According to an embodiment, in operation 520, the runtime environment 169 of the secure device may determine whether the category in which the execution-requested applet is included is in activation, through the dedicated service manager 167. For example, the runtime environment 169 of the secure device may transfer an activation check request for the category, in which the applet is included, to the dedicated service manager 167.

According to an embodiment, in operation 530, the dedicated service manager 167 may identify a category, in which the AID of the execution-requested dedicated service applet is included, through a dedicated service registry (e.g., the dedicated service registry 165 of FIG. 2). For example, the dedicated service manager 167 may identify a category where the AID of the execution-requested dedicated service applet is registered. The AID may be, for example, information included in the execution request for the dedicated service applet. According to an embodiment, the dedicated service manager 167 may determine whether the category in which the AID is included is in activation. For example, the dedicated service manager 167 may determine whether a dedicated service framework corresponding to the category in which the AID is included is in activation (or execution). According to an embodiment, the dedicated service manager 167 may transfer activation information of the category, in which the AID is included, to the runtime environment 169.

According to an embodiment, in operation 540, the runtime environment 169 may request the activation of the identified category. For example, when the identified category is not in activation, the runtime environment 169 may transfer an activation request for a dedicated service framework corresponding to the identified category to the dedicated service manager 167.

According to an embodiment, in operation 551, the dedicated service manager 167 may activate the identified category. For example, the dedicated service manager 167 may activate the dedicated service framework corresponding to the identified category. According to an embodiment, the dedicated service manager 167 may deactivate (or terminate the execution of) the remaining category (or categories) except for the activated category. According to an embodiment, in operation 553, the dedicated service manager 167 may transfer activation information of the identified category to the runtime environment 169. According to an embodiment, the runtime environment 169 may drive the applet execution-requested from the external environment 150 that executes the application. The driven applet may be executed by using the activated dedicated service framework.

According to an embodiment, in operation 560, the runtime environment 169 may transfer the transferred activation information to the external environment 150. According to an embodiment, when the providing of the service through the application is completed, the external environment 150 of the electronic device may transfer complete information to the secure element 160 and may deactivate the activated dedicated service framework.

FIG. 6 is a diagram illustrating a screen in which an electronic device according to an embodiment installs a dedicated service framework and an applet.

Referring to FIG. 6, the electronic device 100 may install a framework and an applet for providing an electronic identification service.

According to an embodiment, in screen 610, the electronic device 100 may display a list 611, which includes a service capable of being provided by a secure element (e.g., the secure element 160 of FIG. 1) through the execution of an application, in a display (e.g., the display 140 of FIG. 1). The service included in the list 611 may include, for example, a credit card service and a car key service. Also, the service included in the list 611 may be a service in which an applet for providing the service is already installed. According to an embodiment, the electronic device 100 may display, in the display, an object 613 for installing a program, which is used to provide a dedicated service, through the secure element. The dedicated service may be, for example, an electronic identification service. According to an embodiment, the electronic device 100 may receive a user input 610a for installing a dedicated service framework and a dedicated service applet through the object 613.

According to an embodiment, in screen 620, the electronic device 100 may install a specified dedicated service framework. For example, when the specified dedicated service framework is not installed, the electronic device 100 may install the specified dedicated service framework in the secure element. According to an embodiment, the electronic device 100 may display an installation phase of the specified dedicated service framework in the display. For example, the electronic device 100 may display installation phase information (e.g., 1/2) in the display, together with guide information (e.g., "while issuing the identification").

According to an embodiment, in screen 630, the electronic device 100 may install a specified dedicated service applet. For example, after determining, through the secure element, whether a dedicated service framework for executing the specified dedicated service applet is in a state of being installed, the electronic device 100 may install the specified dedicated service applet. According to an embodiment, the electronic device 100 may display the installation phase of the specified dedicated service framework in the display. For example, the electronic device 100 may display installation phase information (e.g., 2/2) in the display, together with guide information.

According to an embodiment, in screen 640, the electronic device 100 may display information indicating that a program for providing a dedicated service is completely installed, in the display. For example, the electronic device 100 may display information (e.g., "the identification is issued") indicating that there is ready to provide the electronic identification service, in the display.

According to an embodiment, in screen 650, the electronic device 100 may display a list 651, in which an item 651a corresponding to a service capable of being newly provided is included, in the display.

FIG. 7 is a diagram illustrating a screen in which an electronic device according to an embodiment sets a basic activation service.

Referring to FIG. 7, the electronic device 100 may set an electronic identification service as the basic activation service. The basic activation service may be activated by default even in the case where there is no user input.

According to an embodiment, in screen 710, the electronic device 100 may display a list 711 including a dedicated service capable of being provided through a secure element (e.g., the secure element 160 of FIG. 1) in a display (e.g., the display 140 of FIG. 1). The service included in the list 711 may include, for example, a common service (e.g., a credit card service or a car key service), and a dedicated service (e.g., an electronic identification service). According to an embodiment, the electronic device 100 may receive a user input 710a for setting the basic activation service. For example, the electronic device 100 may receive the user input 710a for selecting an item 711a corresponding to an electronic identification service.

According to an embodiment, in screen 720, the electronic device 100 may perform user authentication for setting the basic activation service. For example, the electronic device 100 may perform fingerprint recognition for setting the electronic identification service as the basic activation service.

According to an embodiment, in screen 730, the electronic device 100 may set a service selected by the user as the basic activation service. For example, the electronic device 100 may set a dedicated service framework for providing the electronic identification service selected by the user as a basic activation framework.

FIG. 8 is a diagram illustrating a screen in which an electronic device according to an embodiment changes a specified service to an activation service.

Referring to FIG. 8, the electronic device 100 may temporarily activate an electronic identification service. The temporarily activated service may be deactivated after a specified function is performed, and a temporarily deactivated basic activation service may be activated.

According to an embodiment, in screen 810, the electronic device 100 may display a list 811 including a dedicated service capable of being provided through a secure element (e.g., the secure element 160 of FIG. 1) in a display (e.g., the display 140 of FIG. 1). The service included in the list 811 may include, for example, a common service (e.g., a credit card service or a car key service), and a dedicated service (e.g., an electronic identification service). According to an embodiment, the electronic device 100 may receive a user input 810a for temporarily activating a specified service. For example, the electronic device 100 may receive the user input 810a for selecting an item 811a corresponding to an electronic identification service.

According to an embodiment, in screen 820, the electronic device 100 may perform user authentication for temporarily activating the specified service. For example, the electronic device 100 may perform fingerprint recognition for temporarily activating the electronic identification service.

According to an embodiment, in screen 830, the electronic device 100 may temporarily activate a service selected by the user. For example, the electronic device 100 may temporarily activate a dedicated service framework for providing the electronic identification service selected by the user. According to an embodiment, the electronic device 100 may temporarily deactivate the remaining service(s) except for the service selected by the user. For example, the electronic device 100 may temporarily deactivate a common service framework for providing a common service.

When activating a dedicated service framework to provide a service, the secure element 160 may deactivate a framework for providing another service and may exclusively activate the dedicated service framework. While the dedicated service framework is exclusively activated, the secure element 160 may be used like a secure element dedicated for providing only the corresponding service.

The electronic device 100 according to various embodiments of the disclosure described with reference to FIGS. 1 to 8 may install a plurality of dedicated service frameworks in one secure element and may selectively activate the plurality of dedicated service frameworks thus installed, and thus, a plurality of dedicated services that are provided by using frameworks to be exclusively executed may coexist in one secure element.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

FIG. 10 is a flowchart 1000 simply illustrating a process in which an electronic device executing an application provides a service by using a secure element, according to an embodiment.

Referring to FIG. 10, in operation 1010, when there is a need to drive an applet stored in a memory of a secure element to allow a first application stored in a first memory to provide a service, an electronic device including the secure element may transfer target information to the secure element. For example, when receiving a user input for requesting the execution of the service in a state where the first application is executed, the electronic device may transfer target information specifying an applet performing the requested service to the secure element.

Afterwards, in operation 1020, the electronic device may select a framework based on at least a portion of the target information. For example, in the case where the target information includes an AID, the electronic device may select a category including the AID and may select a framework corresponding to the category. For another example, in the case where the target information includes information about a category, the electronic device may select a framework corresponding to the category. However, the disclosure is not limited to the above example.

Afterwards, in operation 1030, the electronic device may execute the selected framework by using the secure element. According to an embodiment, the secure element may be associated with a service in which the selected framework should be exclusively provided with respect to another service. In this case, in operation 1030, when the selected framework is executed by using the secure element, the secure element may deactivate another framework that is previously executed. When the selected framework is executed in operation 1030, the secure element may become a state capable of driving the applet specified by the target information.

Afterwards, in operation 1040, the electronic device may drive the applet specified by the target information, based on the executed framework.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a touchscreen display;
a first processor operatively connected with the touchscreen display;
a first memory operatively connected with the first processor, and configured to store a first application; and
a secure element operatively connected with the touchscreen display, the first processor, and the first memory and including:
a second processor; and
a second memory configured to store a first framework, a plurality of second frameworks, and a first applet associated with the first application, the first framework being a common service framework, and each of the plurality of second frameworks being a dedicated service framework that is used exclusively for a specific service,
wherein the first memory includes instructions that, when executed, cause the first processor to:
receive a first user input requesting an execution of the first application through the touchscreen display; and
transfer target information specifying the first applet to the secure element based on the first user input thus received, the target information including an applet identifier (ID) of the first applet,
wherein the second processor is configured to:
identify a category in which the applet ID of the first applet is registered;

select one framework corresponding to the identified category of the plurality of second frameworks;
execute the selected framework;
terminate execution of remaining second frameworks among the plurality of second frameworks except for the selected framework; and
drive the first applet by using the executed framework.

2. The electronic device of claim 1, wherein the instructions cause the first processor to:
execute the first application; and
display a screen of the first application thus executed, in the touchscreen display.

3. The electronic device of claim 1, wherein the first framework is used to drive an applet associated with a plurality of different services, and
wherein the second framework is used to drive an applet associated only with one selected service.

4. The electronic device of claim 1, wherein the second memory is configured to store information about a plurality of categories respectively corresponding to the plurality of second frameworks and at least one applet included in each of the plurality of categories.

5. The electronic device of claim 4, wherein the target information includes information about a category corresponding to the selected framework.

6. The electronic device of claim 4, wherein the instructions cause the first processor to:
receive a second user input for installing an additional second framework; and
transfer an installation request for the additional second framework to the secure element, based on the second user input thus received, and
wherein the second processor is configured to:
determine whether a category corresponding to the additional second framework is stored in the second memory, in response to the installation request;
when the category corresponding to the additional second framework is not stored, install the additional second framework; and
store the category corresponding to the additional second framework in the second memory.

7. The electronic device of claim 6, wherein the additional second framework is a new dedicated service framework not included in the plurality of second frameworks.

8. The electronic device of claim 6, wherein the installation request includes information about the category corresponding to the additional second framework, and
wherein the second processor is configured to:
determine whether the category corresponding to the additional second framework is stored in the second memory, based on the information about the category.

9. The electronic device of claim 4, wherein the instructions cause the first processor to:
receive a third user input for installing a second application; and
transfer an installation request for a second applet associated with the second application to the secure element, based on the third user input thus received, and
wherein the second processor is configured to:
determine whether a category corresponding to a third framework associated with the second applet is stored in the second memory, in response to the installation request;
when the category corresponding to the third framework is in a state of being stored, install the second applet; and
store information about the second applet thus installed, in the second memory.

10. The electronic device of claim 9, wherein the instructions cause the first processor to:
when the third framework is in a state of being stored, install the second application.

11. The electronic device of claim 9, wherein the installation request includes information about the category corresponding to the third framework, and the information about the second applet.

12. A method for controlling an electronic device including a secure element, the method comprising:
receiving a first user input requesting an execution of a first application stored in a first memory;
transferring target information specifying a first applet stored in a second memory included in the secure element to the secure element, based on the first user input thus received, the target information including an applet identifier (ID) of the first applet;
identifying a category in which the applet ID of the first applet is registered;
selecting one framework corresponding to the identified category of a plurality of frameworks stored in the second memory, each of the plurality of frameworks being a dedicated service framework that is used exclusively for a specific service;
executing the selected framework;
terminating execution of remaining second frameworks among the plurality of frameworks except for the selected framework; and
driving the first applet by using the executed framework.

13. The method of claim 12, further comprising:
executing the first application; and
displaying a screen of the first application thus executed, in a touchscreen display.

14. The method of claim 12, wherein each of the plurality of frameworks is used to drive an applet associated only with one selected service.

* * * * *